US006785110B2

(12) United States Patent
Bartel et al.

(10) Patent No.: US 6,785,110 B2
(45) Date of Patent: Aug. 31, 2004

(54) RF SURGE PROTECTION DEVICE

(75) Inventors: Karl C. Bartel, Carson City, NV (US); Arthur Peltier, Carson City, NV (US)

(73) Assignee: PolyPhaser Corporation, Minden, NV (US)

( * ) Notice: Subject to any disclaimer, the term of this patent is extended or adjusted under 35 U.S.C. 154(b) by 106 days.

(21) Appl. No.: 10/267,213

(22) Filed: Oct. 9, 2002

(65) Prior Publication Data

US 2003/0072121 A1 Apr. 17, 2003

Related U.S. Application Data

(60) Provisional application No. 60/329,087, filed on Oct. 12, 2001.

(51) Int. Cl.[7] ............................................ H02H 1/00

(52) U.S. Cl. ...................................... 361/119; 361/111

(58) Field of Search ......................... 361/107, 110–113, 361/117–120, 126, 127, 129, 130; 333/12, 32, 33, 125, 127, 129, 202, 242, 250, 251

(56) References Cited

U.S. PATENT DOCUMENTS

| | | | | | |
|---|---|---|---|---|---|
| 3,750,053 | A | * | 7/1973 | LeDonne | 333/105 |
| 3,831,110 | A | * | 8/1974 | Eastman | 331/107 G |
| 3,845,358 | A | * | 10/1974 | Anderson et al. | 361/126 |
| 4,047,120 | A | * | 9/1977 | Lord et al. | 330/207 |
| 4,262,317 | A | * | 4/1981 | Baumbach | 361/124 |
| 4,359,764 | A | * | 11/1982 | Block | 361/119 |
| 4,384,331 | A | * | 5/1983 | Fukuhara et al. | 701/115 |
| 4,409,637 | A | * | 10/1983 | Block | 361/119 |
| 4,554,608 | A | * | 11/1985 | Block | 361/119 |
| 4,563,720 | A | * | 1/1986 | Clark | 361/111 |
| 4,689,713 | A | * | 8/1987 | Hourtane et al. | 361/118 |
| 4,698,721 | A | | 10/1987 | Warren | 361/110 |
| 4,727,350 | A | * | 2/1988 | Ohkubo | 338/21 |
| 4,984,146 | A | * | 1/1991 | Black et al. | 363/44 |
| 4,985,800 | A | | 1/1991 | Feldman et al. | 361/113 |
| 5,053,910 | A | * | 10/1991 | Goldstein | 361/111 |
| 5,057,964 | A | | 10/1991 | Bender et al. | 361/118 |
| 5,122,921 | A | | 6/1992 | Koss | 361/111 |
| 5,124,873 | A | | 6/1992 | Wheeler et al. | 361/58 |
| 5,321,573 | A | | 6/1994 | Person et al. | 361/111 |
| 5,537,044 | A | * | 7/1996 | Stahl | 324/511 |
| 5,617,284 | A | * | 4/1997 | Paradise | 361/111 |
| 5,625,521 | A | | 4/1997 | Luu | 361/111 |
| 5,667,298 | A | * | 9/1997 | Musil et al. | 366/18 |

(List continued on next page.)

FOREIGN PATENT DOCUMENTS

| | | | |
|---|---|---|---|
| WO | 9510116 | 4/1995 | H01C/7/10 |

OTHER PUBLICATIONS

Notification of Transmittal of the International Search Report, International Search Report, PCT/US03/17050, dated Mar. 10, 2004.

*Primary Examiner*—Ronald Leja
(74) *Attorney, Agent, or Firm*—Snell & Wilmer L.L.P.

(57) ABSTRACT

A surge protection device is disclosed that includes an input path for receiving an rf signal, dc power, and a surge, an output path for propagating the rf signal, and a dc blocking device coupled in series between the input path and the output path. The surge protection device also includes a first inductor coupled to the input path for isolating the rf signal and providing a path for the dc power, a gas tube coupled to the first inductor for routing a portion of the surge to a ground plane, a second inductor coupled to the first inductor for providing a path for the dc power, and a metal oxide varistor coupled to the second inductor for routing a portion of the surge to the ground plane. Furthermore, the surge protection device includes a third inductor coupled to the second inductor for providing a path for the dc power, a diode coupled to the third inductor for routing a portion of the surge to the ground plane, and a fourth inductor coupled to the third inductor for providing a path for the dc power to the output path.

42 Claims, 9 Drawing Sheets

U.S. PATENT DOCUMENTS

| | | | | | |
|---|---|---|---|---|---|
| 5,721,662 | A | | 2/1998 | Glaser et al. | 361/119 |
| 5,781,844 | A | * | 7/1998 | Spriester et al. | 725/149 |
| 5,854,730 | A | | 12/1998 | Mitchell et al. | 361/38 |
| 5,953,195 | A | | 9/1999 | Pagliuca | 361/170 |
| 5,986,869 | A | | 11/1999 | Akdag | 361/119 |
| 6,054,905 | A | * | 4/2000 | Gresko | 333/100 |
| 6,060,182 | A | | 5/2000 | Tanaka et al. | 428/698 |
| 6,061,223 | A | | 5/2000 | Jones et al. | 361/119 |
| 6,115,227 | A | | 9/2000 | Jones et al. | 361/119 |
| 6,236,551 | B1 | | 5/2001 | Jones et al. | 361/119 |
| 6,243,247 | B1 | | 6/2001 | Akdag et al. | 361/111 |
| 6,292,344 | B1 | | 9/2001 | Glaser et al. | 361/119 |
| 6,385,030 | B1 | | 5/2002 | Beene | 361/119 |

* cited by examiner

RF SURGE PROTECTION DEVICE

CROSS-REFERENCE TO RELATED APPLICATION

This application relates to and claims priority from U.S. Provisional Patent Application Serial No. 60/329,087, filed Oct. 12, 2001, entitled "RF SURGE PROTECTOR," which is herein incorporated by reference for all purposes.

BACKGROUND OF THE INVENTION

1. Field of the Invention

The present invention relates generally to the field of surge protection, and more particularly to a radio frequency (rf) surge protection device.

2. Description of the Related Art

Surge protection devices protect electronic equipment from being damaged by large variations in the current and voltage across power and transmission lines resulting from lightning strikes, switching surges, transients, noise, incorrect connections, and other abnormal conditions or malfunctions. Large variations in the power and transmission line currents and voltages can change the operating frequency range of the electronic equipment and can severely damage and/or destroy the electronic equipment. For example, lightning is a complex electromagnetic energy source having potentials estimated at from 5 million to 20 million volts and currents reaching thousands of amperes that can severely damage and/or destroy the electronic equipment.

Surge protection devices typically found in the art and used in protecting electronic equipment include capacitors, gas tubes, and metal oxide varistors (MOVs). A capacitor blocks the flow of direct current (dc) and permits the flow of alternating current (ac) depending on the capacitor's capacitance and the current frequency. At certain frequencies, the capacitor might attenuate the ac signal. For example, the larger the capacitance value, the greater the attenuation. Typically, the capacitor is placed in-line with the power or transmission line to block the dc signal and undesirable surge transients.

Gas tubes contain hermetically sealed electrodes, which ionize gas during use. When the gas is ionized, the gas tube becomes conductive and the breakdown voltage is lowered. The breakdown voltage varies and is dependent upon the rise time of the surge. Therefore, depending on the surge, several microseconds may elapse before the gas tube becomes ionized, thus resulting in the leading portion of the surge passing to the capacitor. Gas tubes are attached at one end to the power or transmission line and at another end to the ground plane, diverting the surge current to ground.

MOVs are typically utilized as voltage limiting elements. If the voltage at the MOV is below its clamping or switching voltage, the MOV exhibits a high resistance. If the voltage at the MOV is above its clamping or switching voltage, the MOV exhibits a low resistance. Hence, MOVs are sometimes referred to as non-linear resistors because of their nonlinear current-voltage relationship. The MOV is attached at one end to the power or transmission line and at another end to the ground plane.

One drawback of conventional surge protection devices is the difficulty in impedance matching the surge protection device with the system. Another drawback of conventional surge protection devices is the elevated voltage at which they become conductive and the higher throughput energy levels.

SUMMARY OF THE INVENTION

One embodiment of the present invention is a surge protection device, which includes an input path for receiving an rf signal, dc power, and a surge, an output path for propagating the rf signal, and a dc blocking device coupled in series between the input path and the output path. The surge protection device also includes a first inductor coupled to the input path for isolating the rf signal and providing a path for the dc power and the surge, a gas tube coupled to the first inductor for routing a portion of the surge to a ground plane, a second inductor coupled to the first inductor for providing a path for the dc power, and a metal oxide varistor coupled to the second inductor for routing a portion of the surge to the ground plane. Furthermore, the surge protection device includes a third inductor coupled to the second inductor for providing a path for the dc power, a diode coupled to the third inductor for routing a portion of the surge to the ground plane, and a fourth inductor coupled to the third inductor for providing a path for the dc power to the output path. The diode conducts prior to the MOV, which conducts prior to the gas tube. Therefore, the diode diverts a first portion of the surge, the MOV diverts a second portion of the surge, and the gas tube diverts a third portion of the surge to the common ground. In one embodiment, the diode responds in nanoseconds, the MOV a short time thereafter, and the gas tube is the last element to respond to the surge. This sequence prevents most of the surge from reaching the output path.

Another embodiment of the present invention is an apparatus for isolating dc power and a surge from an rf path to improve the bandwidth of an rf signal that travels along the rf path. The apparatus includes a conductive plate, an inductor positioned adjacent to the conductive plate for routing the dc power and the surge away from the rf path, and means, coupled to the inductor, for diverting the surge to the conductive plate. The apparatus also includes a dc path coupled to the inductor for routing the dc power to the rf path.

Advantages of the surge protection device include dc circuitry on a plate or circuit board for passing dc currents, isolation from the rf signal path with inductors calculated to be high impedance to the respective rf bandwidth, and a unique cavity, which provides for an improved rf signal path and better impedance matching of the surge protection device and the system as compared to the more conventional rectangular cavity.

For purposes of summarizing the present invention, certain aspects, advantages, and novel features of the present invention have been described herein. Of course, it is understood that not necessarily all such aspects, advantages or features will be embodied in any one particular embodiment of the present invention.

DETAILED DESCRIPTION OF THE PRESENTLY PREFERRED EMBODIMENTS

Surge protection devices that implement the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
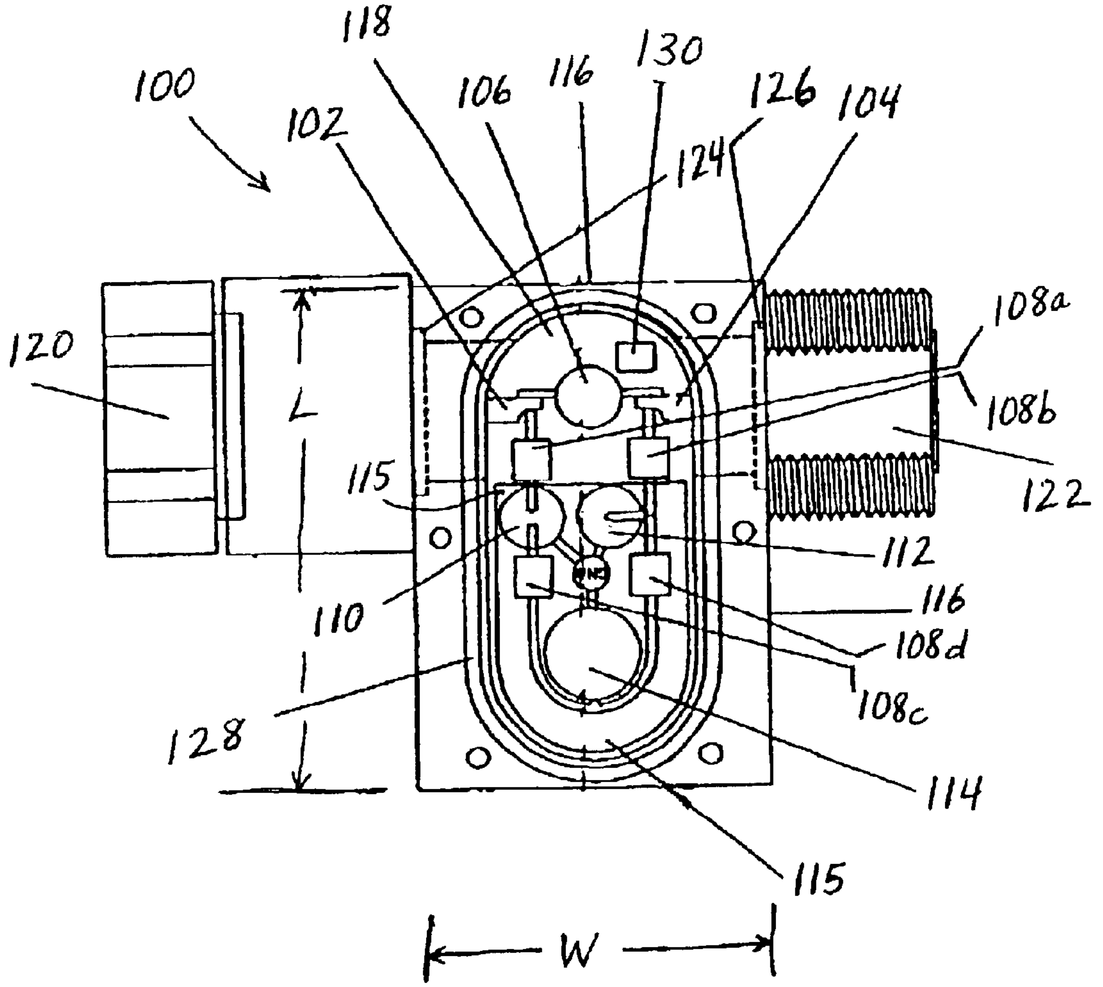
FIG. 1 is a top plan view of a surge protection device of the present invention with its housing cover removed to show the physical layout of its components.

Referring now more particularly to the drawings, FIG. 1 is a top plan view of a surge protection device 100 of the present invention with its housing cover removed to show the physical layout of its components. The surge protection device 100 is generally part of a telecommunications system. The surge protection device 100 is used to protect electronic equipment from surges when the electronic equipment needs an rf signal and a dc power source, which can both be provided using the same power or transmission line, e.g., coaxial conductor. The electronic equipment is protected by the surge protection device 100, which provides a low impedance path for the desired higher frequency rf signal while attenuating the energy or signal at lower frequencies. The surge protection device 100 can be configured to cover bandwidths from dc to about 7.0 GHz. The dc voltage of the system can range from about 5 volts (V) dc to about 102 V dc at a dc current of up to about 5 amps. In one embodiment, the rf rms power capability of the surge protection device 100 is about 600 watts (W) continuous. The surge protection device 100 can be tuned for impedance matching and provides a filter for various microwave bandwidths and circuitry for passing dc currents and voltages.

Figure 2:
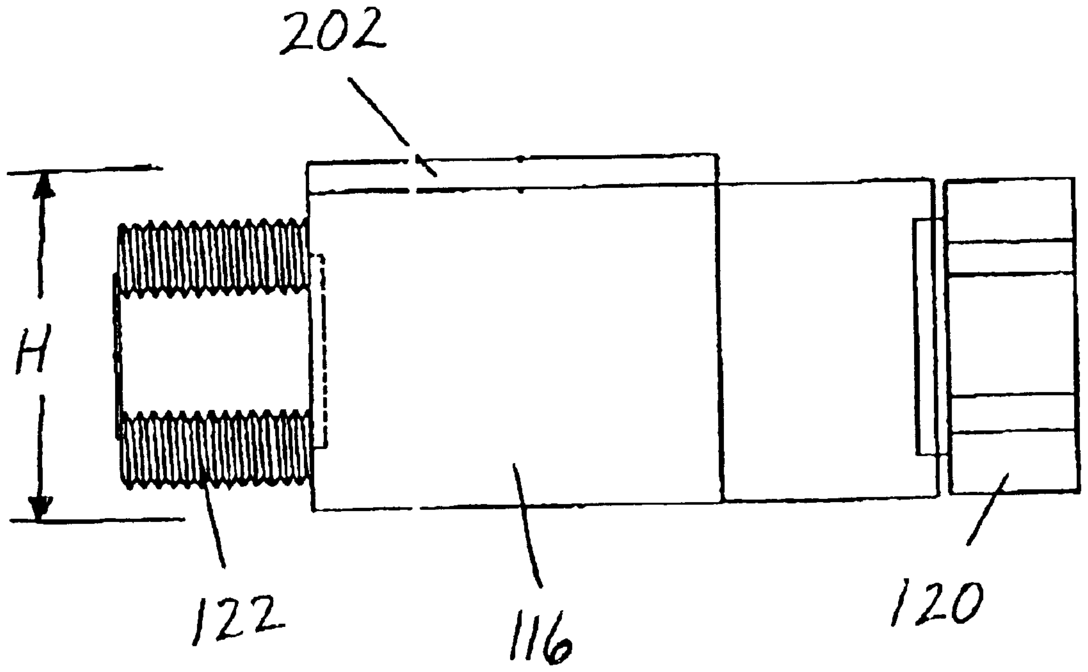
FIG. 2 is a front view of the surge protection device of FIG. 1 showing the housing cover secured in place.

The surge protection device 100 might include an input path 102, an output path 104, a dc blocking device 106, inductors 108*a*–108*d*, a gas tube 110, a diode 112, and a metal oxide varistor (MOV) 114. The surge protection device 100 might also include a housing 116 having a cavity 118 for housing the components. The housing 116 serves as a common ground for the surge protection device 100. The housing 116 has a length L of approximately 63.50 millimeters (mm) (2.50 inches), a width W of approximately 42.16 mm (1.66 inches), and a height H of approximately 31.24 mm (1.23 inches) (see also FIG. 2). The housing 116 has a housing cover 202 that has a substantially flat inside portion (see also FIGS. 2 and 4). Depending on the design specifications, all the components or elements described or shown may not be required.

The surge protection device 100 might also include input and output connectors 120, 122 adapted to connect to the housing 116. The input connector 120 has a center pin for connecting to the input path 102 and the power or transmission line for receiving rf signals, dc power and surges. The power or transmission line might also be connected to an antenna, which can receive and transmit rf signals and surges. The output connector 122 has a center pin for connecting to the output path 104 and the electronic equipment that is to be protected from the surges. The output connector 122 provides dc power, which is supplied from the power or transmission line, to the electronic equipment. In one embodiment, the input and output connectors 120, 122 are press fit connectors. Any connector type and gender combination may be used, although the most versatile is illustrated in FIG. 1, where the input connector 120 is a female connector and the output connector 122 is a male connector. Each connector 120, 122 might include a groove 124, 126 that receives an o-ring (not shown) for preventing moisture and water from entering the cavity 118. Furthermore, the housing 116 might include a groove 128 that is positioned at the top of the surge protection device 100 and in combination with the o-ring and the housing cover 202, seal the surge protection device 100 and provide an environmentally weatherized surge protection device 100 (see also FIG. 2).

Figure 3:
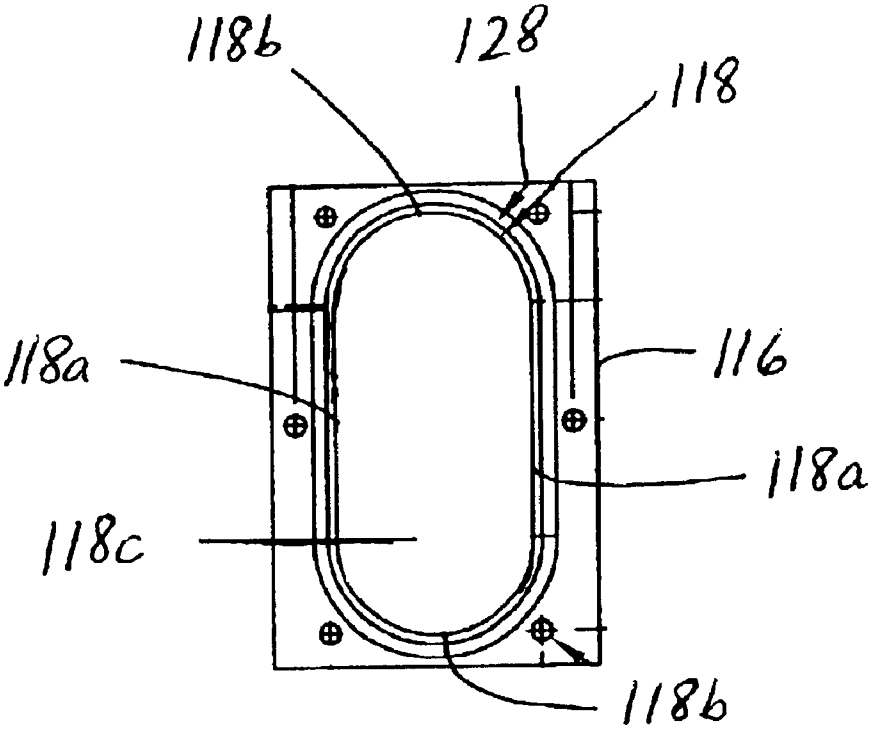
FIG. 3 is a top view of the housing with the components removed to show the cavity of the surge protection device of FIG. 1.
Figure 4:
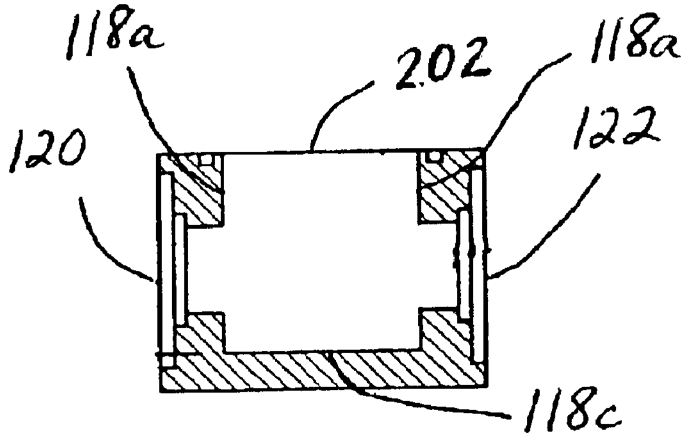
FIG. 4 is a cross-sectional side view of the housing with the components removed to show the cavity of the surge protection device of FIG. 1.

Referring to FIGS. 3 and 4, the components (not shown) of the surge protection device 100 fit within the cavity 118, which is defined by substantially parallel flat side walls 118*a*, substantially non-parallel front and rear walls 118*b* joining the side walls 118*a*, and a substantially flat bottom surface 118*c*. The housing cover 202 covers the cavity 118. In one embodiment, the front and rear walls 118*b* are smooth curved end walls, which have the shape of a semi-circle or arc. In one embodiment, the front wall is curved and the rear wall is straight and substantially perpendicular to the flat side walls 118*a*. The cavity 118 can be described as having a laterally stretched cylindrical, elliptical, oval or ovoid shape with straight flat side walls 118*a*. The cavity 118, for example, the side walls 118*a* and the curved end walls, can also have an eccentric shape to enhance specific rf properties. These properties might include selected bandwidth enhancement or specific tuning for filtering of specified frequencies. The length of each side wall 118*a* is about 30.48 mm (1.2 inches) and the radius of curvature of each curved end wall 118*b* is about 12.80 mm (0.504 inches). The smooth curved front wall 118*b* of the cavity 118 near the connectors 120, 122 provides low parasitic matched impedance for the rf signal. The smooth curved end walls 118*b* improve the rf signal path and increase the bandwidth of the surge protection device 100. The rf signal path is composed of the input and output paths 102, 104 and the dc blocking device 106, and is located in and adjacent to the cavity 118. The input and output paths 102, 104 can also be referred to as input and output ports. Furthermore, the input path 102 can be referred to as an output path 102, and vice versa, depending on the system configuration.

Figure 5A:
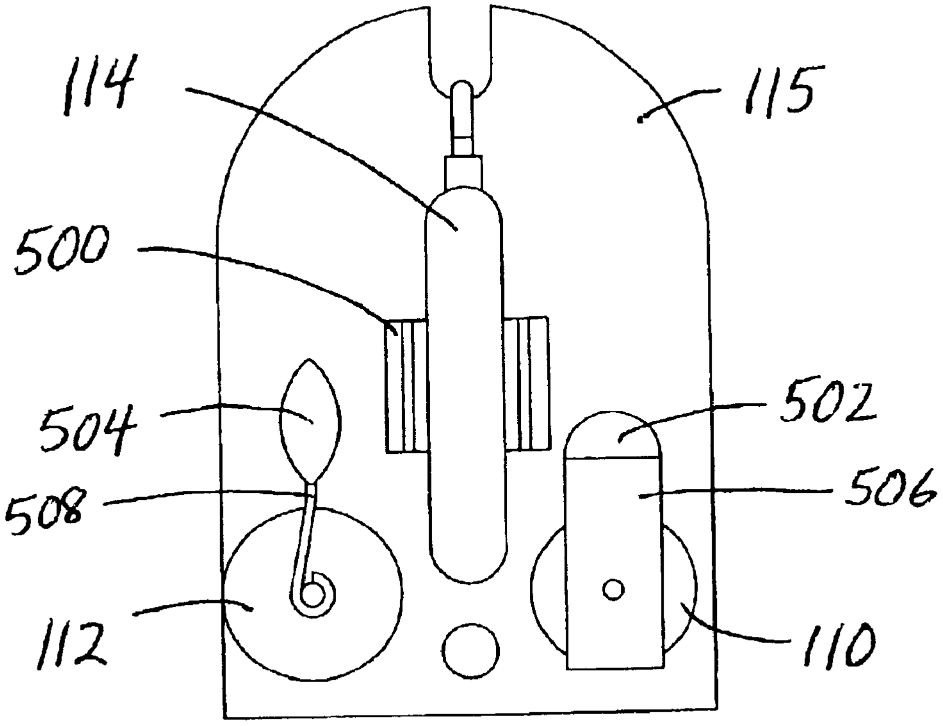
FIGS. 5*a*, 5*b* are top plan views showing the physical layout of the components mounted on a conductive plate.
Figure 5B:
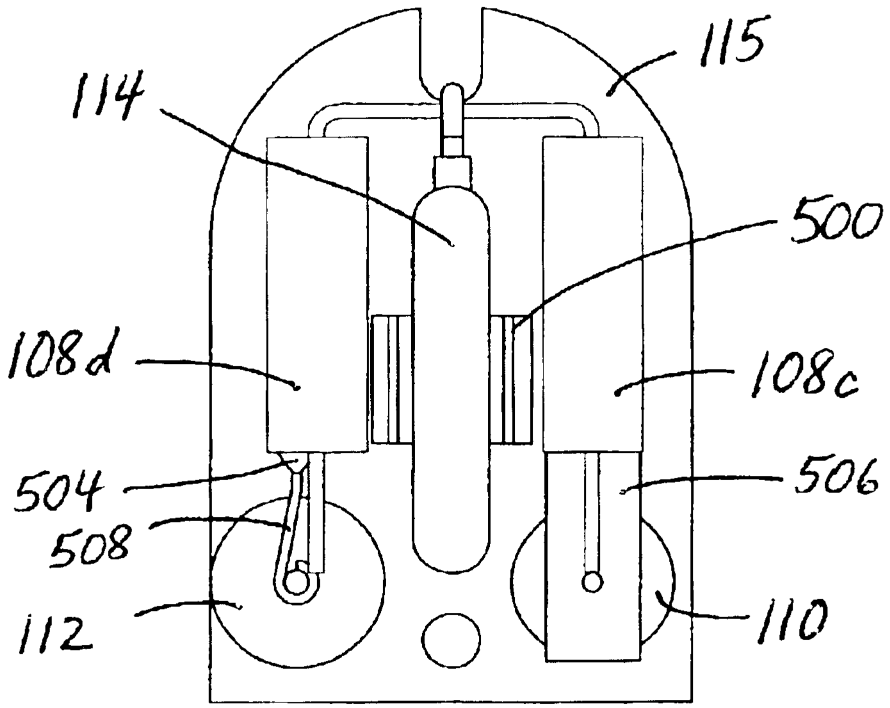

FIGS. 5*a*, 5*b* are top plan views showing the physical layout of the components mounted, e.g., secured or soldered, on a plate 115, which is positioned near or on the bottom portion of the cavity 118 and which may be electrically and physically connected to the bottom surface 118*c* of the cavity 118 with one or more stand-offs. The plate 115 covers a portion of the bottom surface 118*c* of the cavity 118 (see FIG. 1). The components are mounted to the plate 115 to allow precise placement of the components and for isolation from the rf signal path. The plate 115 can be made of a conductive or metallic material such as a copper plate, a copper foil, or a pc board. Preferably, the plate 115 is a tin coated copper plate having a thickness of about 0.8128 mm (0.032 inches). The plate 115 is sometimes referred to as a ground plane.

Figure 8A:
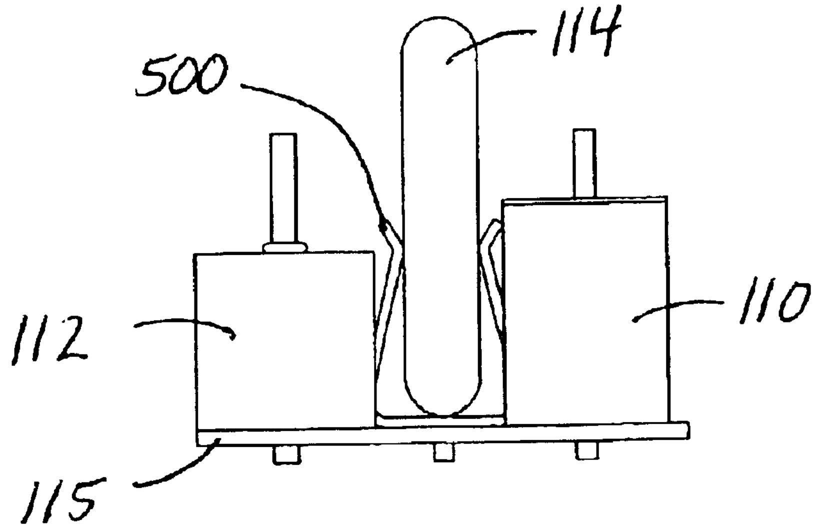
FIGS. 8*a*, 8*b* are front views showing the physical layout of the components.
Figure 8B:
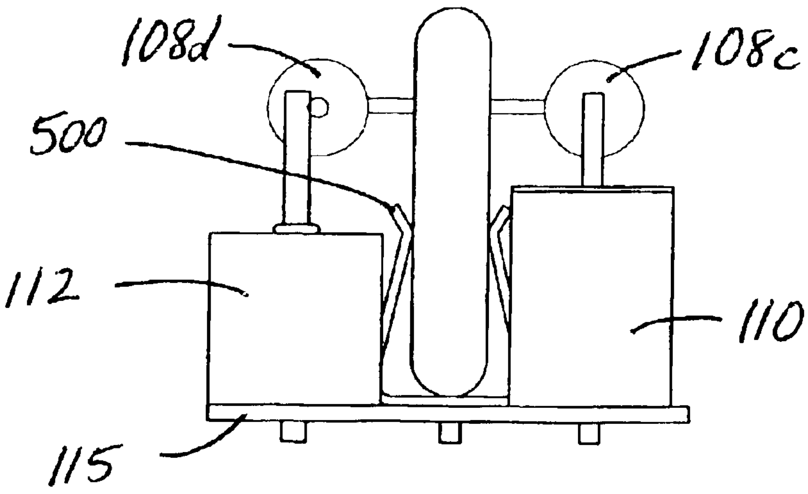
Figure 7A:
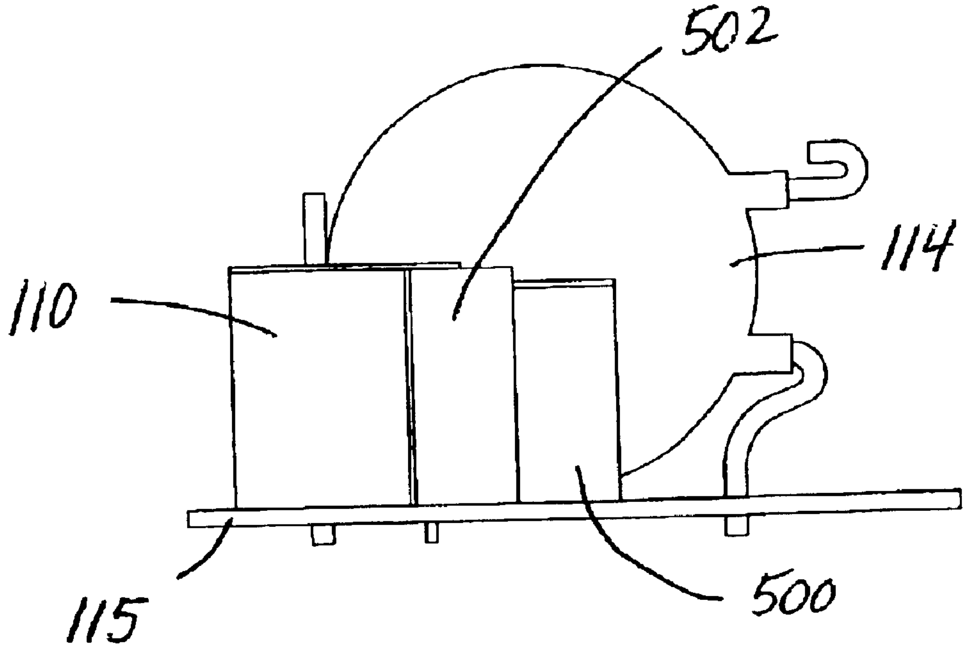
FIGS. 7*a*, 7*b* are right side views showing the physical layout of the components.
Figure 6A:
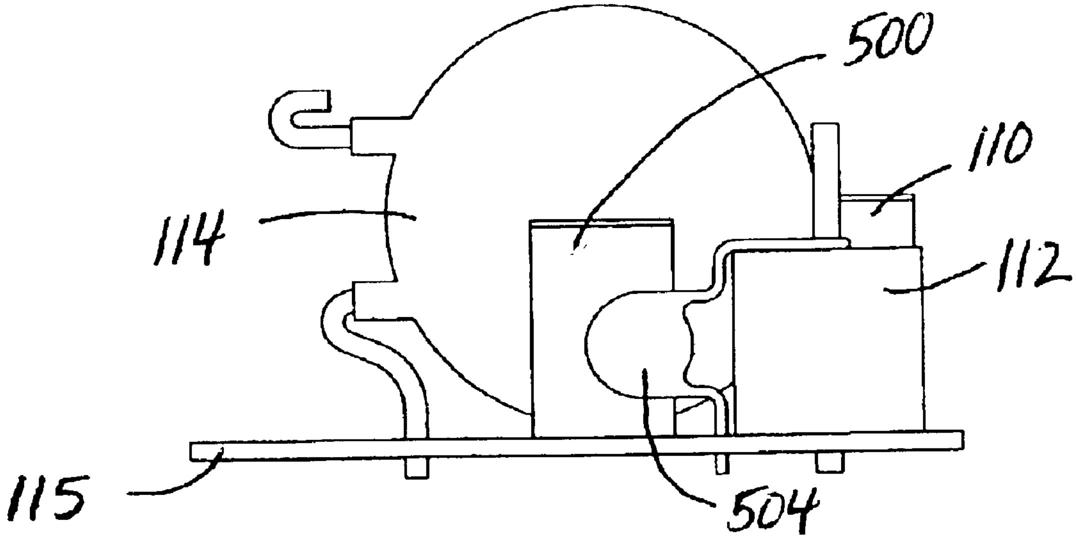
FIGS. 6*a*, 6*b* are left side views showing the physical layout of the components.
Figure 7B:
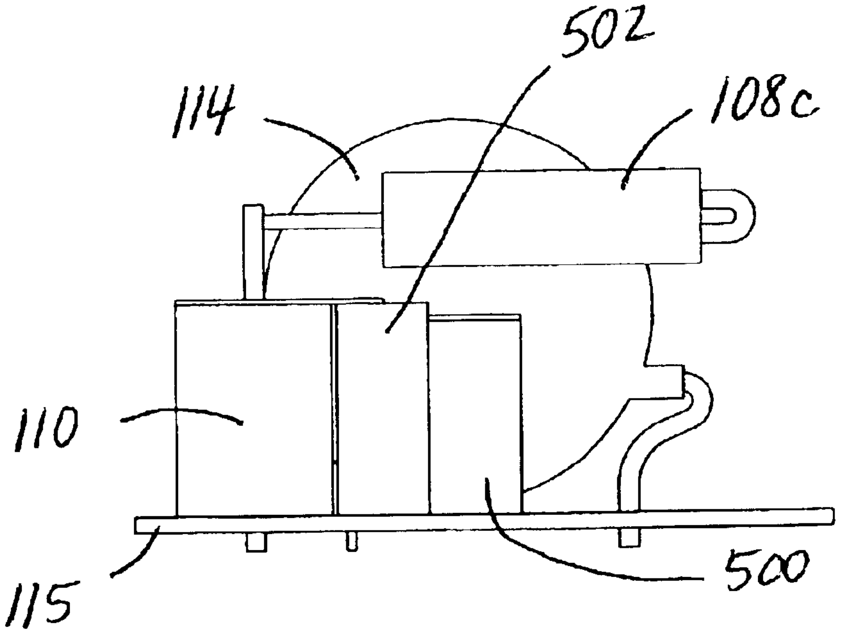
Figure 6B:
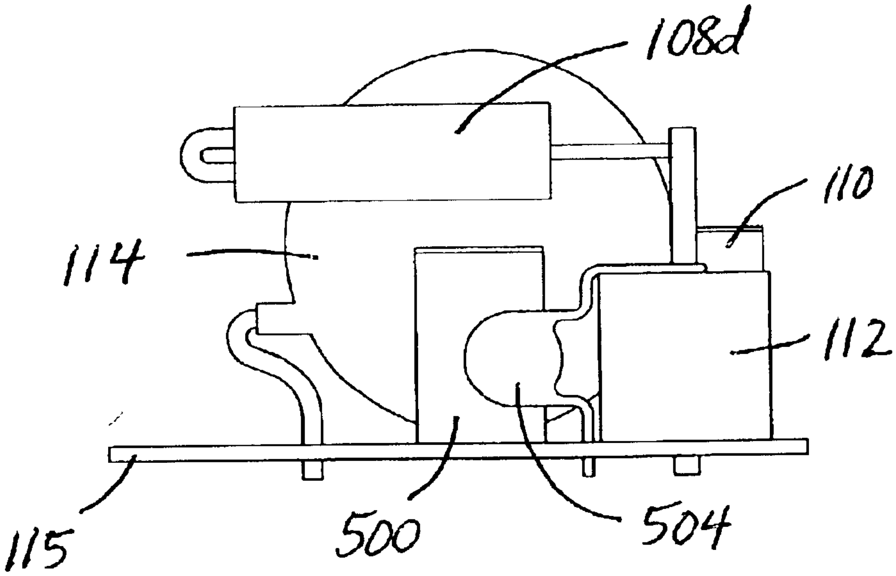

FIGS. 6*a*, 6*b* are left side views showing the physical layout of the components, FIGS. 7*a*, 7*b* are right side views showing the physical layout of the components, and FIGS. 8*a*, 8*b* are front views showing the physical layout of the components. As shown in FIGS. 5–8, the MOV 114 is centered in the left-right direction (i.e., width) on the plate 115 and is electrically coupled to the plate 115 using a mounting clip 500. The mounting clip 500 is mounted to the plate 115. The gas tube 110 and the capacitor 502 are mounted on one side of the plate 115 and are coupled together using a conductor 506 such as a low inductance wire plate. The diode 112 and the capacitor 504 are mounted on the other side of the plate 115 and are coupled together using the leads of the capacitor 504 or a low inductance wire 508. The inductors 108*c*, 108*d* are positioned above the plate 115, the diode 112, the gas tube 110, and the capacitors 502, 504, and are positioned substantially parallel to the MOV 114. The dc blocking device 106 and the inductors 108*a*, 108*b* are positioned above the bottom surface 118*c* of the cavity 118 (see FIGS. 1, 3 and 4). The physical layout of the components provides for isolation of the components from the rf signal path, enhances the bandwidth of the surge protection device, and aids in impedance matching. The physical layout can be modified depending on the desired frequency range of operation. One of ordinary skill in the art will be able to modify the physical layout of one or more of the components to achieve the desired frequency range.

Figure 9:
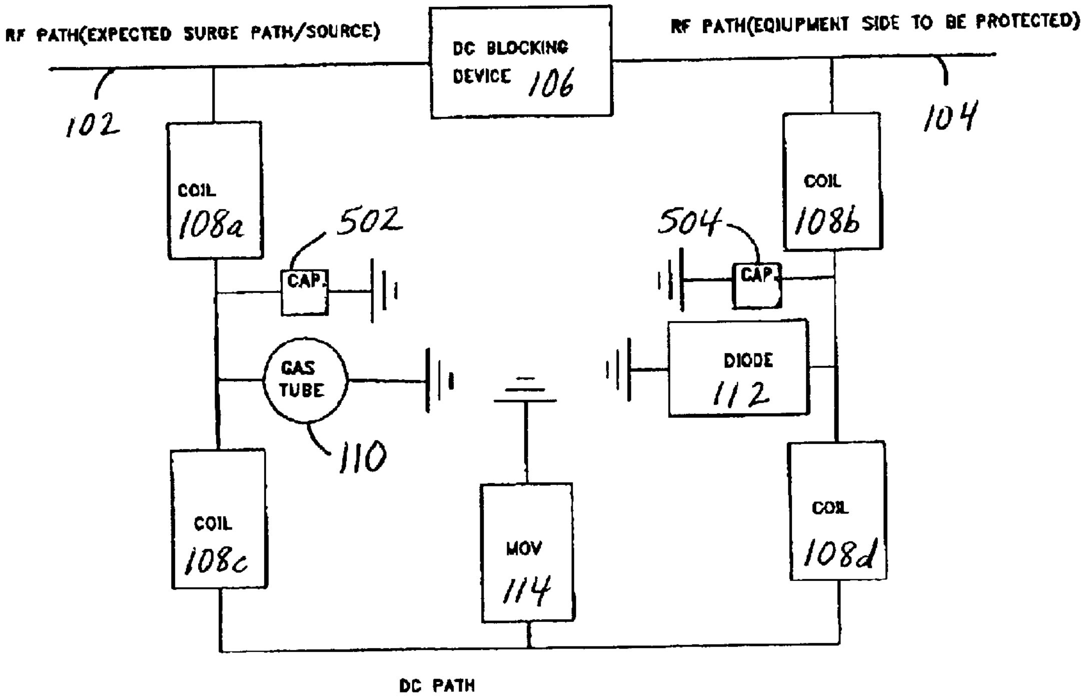
FIG. 9 is a schematic diagram of the surge protection device of FIG. 1.

FIG. 9 is a schematic diagram of the surge protection device 100 of FIG. 1. The term "dc path" refers to the circuit topology from the input path 102 to the output path 104, and vice versa, that may include a conductor, the inductors 108*a*–108*d*, the gas tube 110, the diode 112, and the MOV 114. Hence, the dc current may flow in either direction. The dc path provides a path for allowing dc power to travel to the input path 102 or the output path 104 and maintaining dc power to the electronic equipment while routing or diverting nearly all of the undesired surge energy to the common ground.

The input path 102 is coupled at one end to a power or transmission line for receiving rf signals, dc power and surges, which can be electromagnetic energy having large voltages and currents, and at the other end to the dc blocking device 106. The rf signals and the dc power are typically provided on the same input path 102. The output path 104 is coupled at one end to electronic equipment that is to be protected from the surges and at the other end to the dc blocking device 106. Hence, the dc blocking device 106 is electrically coupled in series between the input path 102 and the output path 104. The input and output paths 102, 104 are typically conductors capable of carrying rf signals, dc power and surges. For example, the input and output paths 102, 104 can be coaxial cables or conductors, connector pins, electrodes and metallic traces or wires. The rf signals may be transmitted and received through the surge protection device 100 via the input and output paths 102, 104.

In one embodiment, the dc blocking device 106 is a capacitor having a capacitance of between about 5 picofarads (pF) and about 6,000 pF. The capacitor can be realized in either lumped or distributed form. The dc blocking device 106 is centered in the left-right direction (i.e., width) of the cavity 118 for impedance matching the surge protection device 100 with the system. In one embodiment, the dc blocking device 106 is positioned at the center or origin of the radius of curvature (sometimes referred to as a center point) of the smooth curved front wall 118*b*. The dc blocking device 106 may be offset from the center or origin to enhance specific rf properties. These properties might include selected bandwidth enhancement or specific[]tuning for filtering of specified frequencies. Typically, the surge protection device 100 and the system are impedance matched to about 50 ohms. The dc blocking device 106 can be a temperature compensation capacitor, parallel rods, coupling devices, conductive plates, or any other device or combination of elements that produce a capacitance or capacitive effect. The capacitance of the dc blocking device 106 can vary depending on the system characteristic such as the frequency of operation of the system. For example, if the frequency of operation of the system is between about 700 MHz and about 2.7 GHz, a useful capacitance value for the dc blocking device 106 is about 34 pF.

The coils or inductors 108*a*–108*d* have an impedance value to the rf signal that is dependent on the size of the inductors 108*a*–108*d* and the frequency of the rf signal. For example, the coil size of each inductor 108*a*–108*d* can be adjusted to alter the resistance in the coil. The inductors 108*a*, 108*b* are sometimes referred to as isolation devices because they isolate or prevent the rf signal from reaching the dc path. The inductors 108*a*, 108*b* have an inductance of between about 0.1 microhenry ($\mu$H) and about 2.0 $\mu$H. The inductor 108*a* is electrically coupled to the input path 102, the inductor 108*c*, and the gas tube 110 and the inductor 108*b* is electrically coupled to the output path 104. The inductors 108*c*, 108*d* have an inductance of between about 1.0 $\mu$H and about 10.0 $\mu$H. In one embodiment, the inductor 108*c* is electrically coupled to the gas tube 110 and the inductor 108*b* is electrically coupled to the inductor 108*d* and the diode 112.

The gas tube 110 has a turn-on current of about 1.0 mA and a turn-on voltage of between about 10 V dc and 1,000 V dc, and preferably about 90, 120, 180 or 600 V dc, depending on the system characteristics. The gas tube 110 has a first end that is electrically coupled to inductors 108*a*, 108*c* and a second end that is electrically coupled to the ground plane. The gas tube 110 can be a neon gas tube, manufactured by Sankosha.

The diode 112 is preferably a bi-directional Zener diode having a turn-on current of about 1.0 mA and a turn-on voltage of between about 5 V dc and about 110 V dc. In one embodiment, the diode 112 has a turn-on voltage of about 6.8 V dc±0.34 V dc at a turn-on current of about 50.0 mA. The turn-on voltage of the diode 112 is typically about 15 percent to about 20 percent greater than the dc voltage of the system. The diode 112 has a first end that is electrically coupled to inductors 108*b*, 108*d* and a second end that is electrically coupled to the ground plane.

The MOV 114 has a turn-on voltage of between about 18 V dc and about 120 V dc with a turn-on current of about 1.0 mA. In one embodiment, the MOV 114 has a turn-on voltage of about 18 V dc±1.8 V dc with a turn-on current of about 1 mA. The MOV 114 has a first end that is electrically coupled to inductors 108*c*, 108*d* and a second end that is electrically coupled to the ground plane. In one embodiment, the MOV 114 is attached to the mounting clip 500, which is soldered to the plate 115, for attaching, electrically decoupling and shielding the MOV 114 to the plate 115 (see also FIGS. 5–8). The MOV 114 can be a S20K11 MOV, manufactured by Siemens.

The shunt elements include the gas tube 110, the diode 112, and the MOV 114, which are located along the dc path, provide for clamping and surge routing to the common ground during surge incursions. Two-stage clamping can be provided by the diode 112 and the MOV 114 at two different current levels to reduce voltage spikes. For example, the diode 112 can be clamped at about 100 amps and the MOV can be clamped at about 600 amps. This provides the advantage of preventing voltage spikes from reaching and damaging the electronic equipment.

The surge protection device 100 might include one or more tuning tabs 130 that are attached to the plate 115. In one embodiment, the tuning tab 130 is positioned on the plate 115 adjacent to the dc blocking device 106. The tuning tab 130 is typically a piece of copper material that provides stray capacitance and coupling to enhance the bandwidth of the surge protection device 100. Several tuning tabs 130 may be located on the plate 115 and throughout the cavity 118 to adjust and enhance the bandwidth of the surge protection device 100.

The surge protection device 100 might include capacitors 502, 504 (see FIGS. 5–7, 9, 10) for adjusting the bandwidth and aiding in impedance matching of the surge protection device 100 and the system. Each capacitor 502, 504 has a capacitance of between about 1 pF and about 6,000 pF. The capacitor 502 has a first end that is electrically coupled to the inductor 108*a* and the gas tube 110, and a second end that is electrically coupled to the ground plane. The capacitor 504 has a first end that is electrically coupled to the inductors 108*b*, 108*d* and a second end that is electrically coupled to the ground plane. In one embodiment, the first end of the capacitor 504 is electrically coupled to the diode 112.

During normal operation, the rf signals are transmitted and received through the dc blocking device 106 and the dc power is routed from the input path 102, through the inductor 108*a*, the inductor 108*c*, the inductor 108*d*, and the inductor 108*b*, to the output path 104, and ultimately to provide dc power to the electronic equipment. The dc power can also flow in the opposite direction. A surge condition exists when one or more spikes in the ac current and/or voltage (i.e., a surge) travels along the power or transmission line and arrives at the input path 102. During a surge condition, the dc blocking device blocks the surge, which is routed through the inductor 108*a*. The diode 112 has a faster turn-on time and a lower turn-on voltage compared to the MOV 114, which has a faster turn-on time and a lower turn-on voltage compared to the gas tube 110. Hence, each successive component can handle higher energy and power levels. Therefore, the leading portion of the surge is first diverted to the ground plane by the diode 112 because it conducts first. Soon thereafter, the MOV 114 conducts, causing an increasing portion of the surge to be diverted to the ground plane through the MOV 114. Soon thereafter, the gas tube 110 conducts, diverting a substantial portion of the surge to the ground plane. Very small traces of surge energy may still pass through the inductor 108*b* to the output path 104; however, the very small traces of surge energy are not harmful to the electronic equipment. Therefore, configuring the diode 112, the MOV 114, and the gas tube 110 in this manner provides the advantage of quickly diverting the leading portion of the surge to the ground plane using the diode 112 and the MOV 114 until the gas tube 110 conducts, which can divert the remaining portion of the surge. This prevents most, if not all, of the harmful surge from reaching the output path 114 and the electronic equipment.

In one embodiment, the surge protection device 100 is configured to operate over a frequency range or bandwidth of between about 700 MHz and about 2.7 GHz and at a dc power of about 6 volts at 4 amps. For this embodiment, the dc blocking device 106 has a capacitance of about 34 pF, each inductor 108*a*, 108*b* has an inductance of about 0.5 μH, each inductors 108*c*, 108*d* has an inductance of about 2 μH, the gas tube 110 has a turn-on voltage of about 180 V dc±20 V dc, the diode 112 has a turn-on voltage of about 6.8 V dc±0.34 V dc at a current of about 50.0 mA, the MOV 114 has an ac operating voltage of about 11 V, a dc operating voltage of about 14 V, and a turn-on voltage of about 18 V dc±1.8 V dc with a turn-on current of about 1.0 mA, the capacitor 502 has a capacitance of about 560 pF, and the capacitor 504 has a capacitance of about 1,000 pF.

Figure 10:
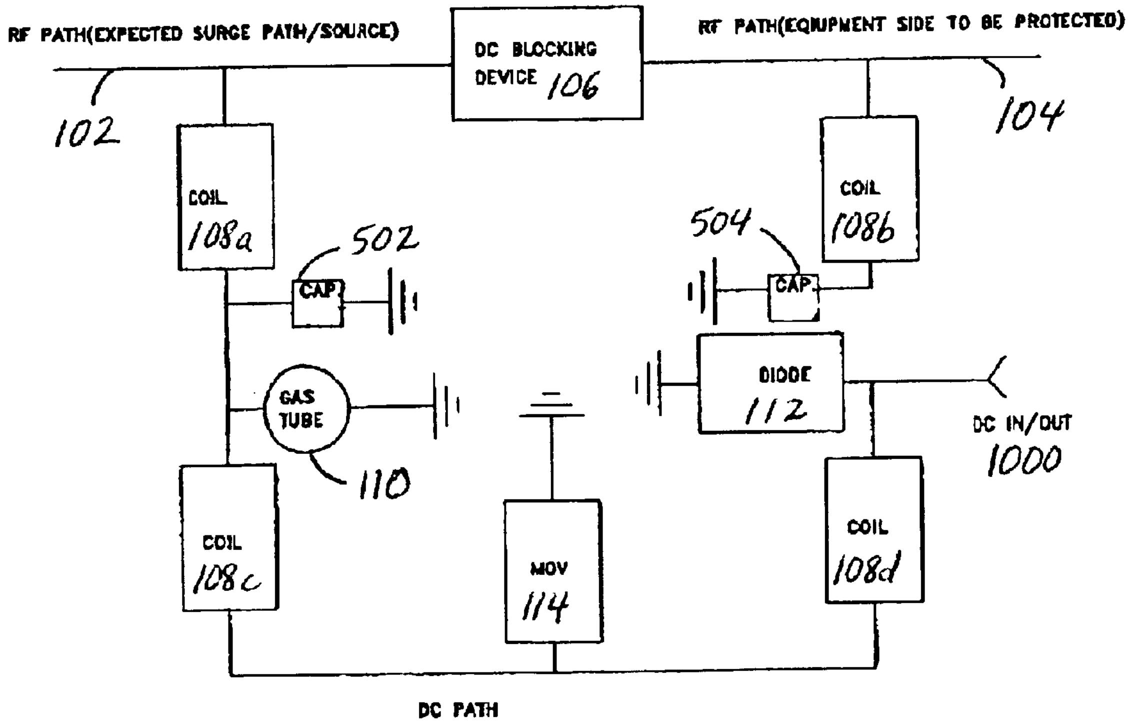
FIG. 10 is a schematic diagram that is a variation of the schematic diagram of FIG. 9.
Figure 1:
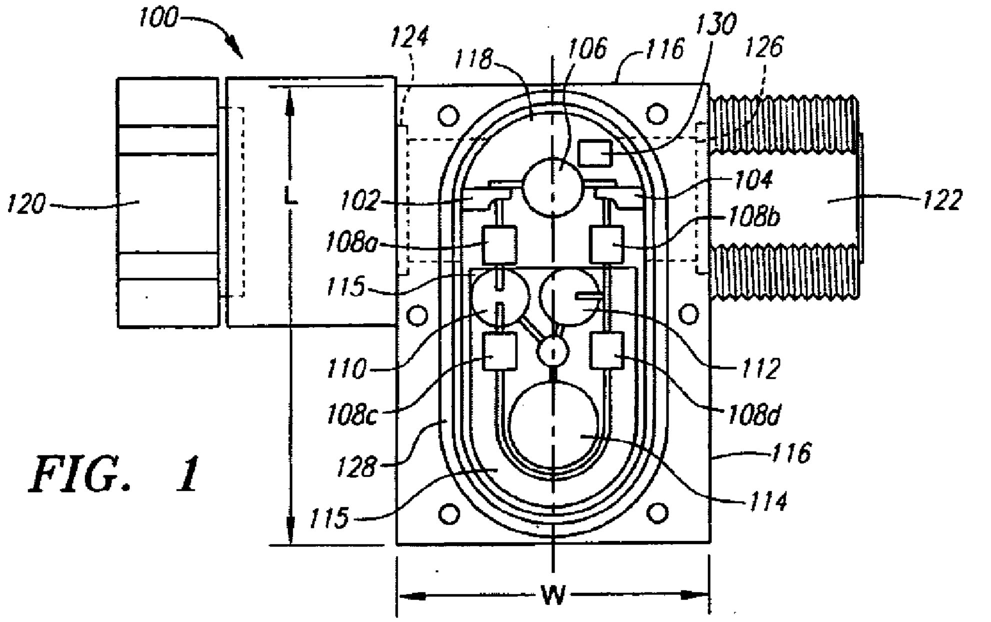
Figure 2:
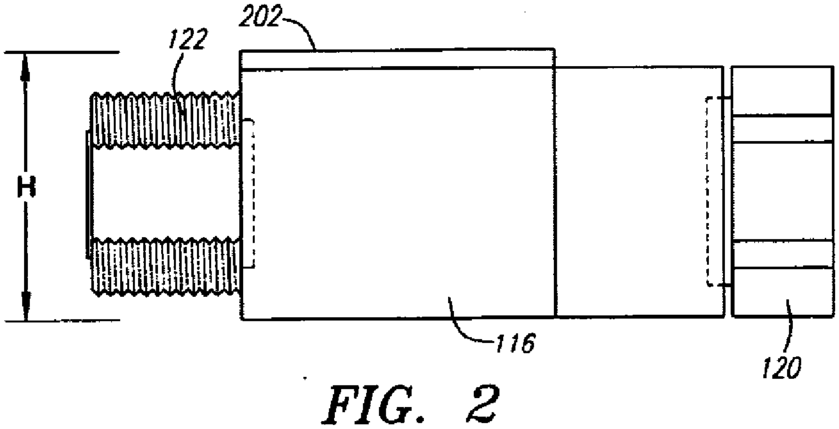
Figure 3:
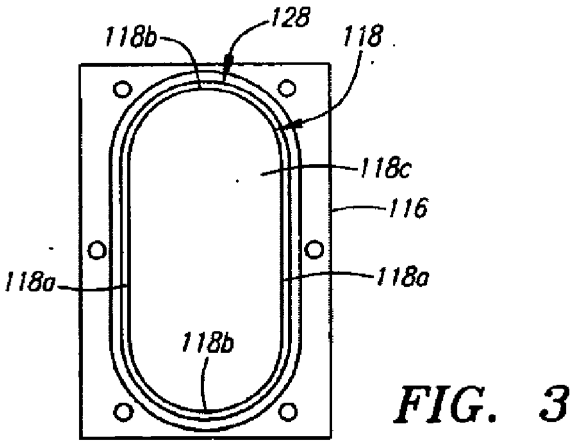
Figure 4:
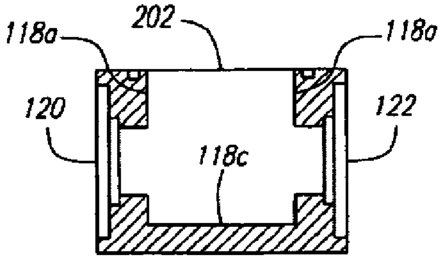
Figure 5A:
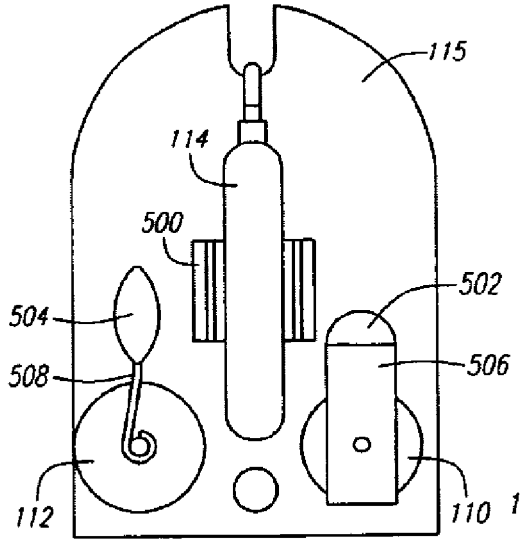
Figure 8A:
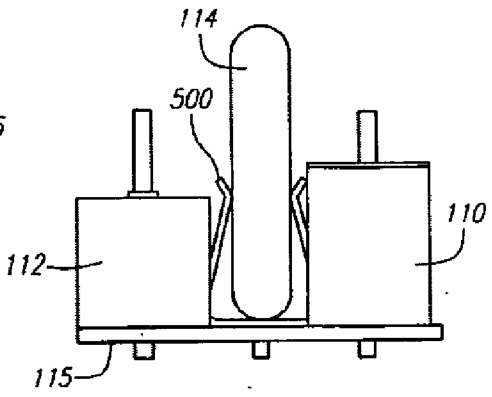
Figure 6A:
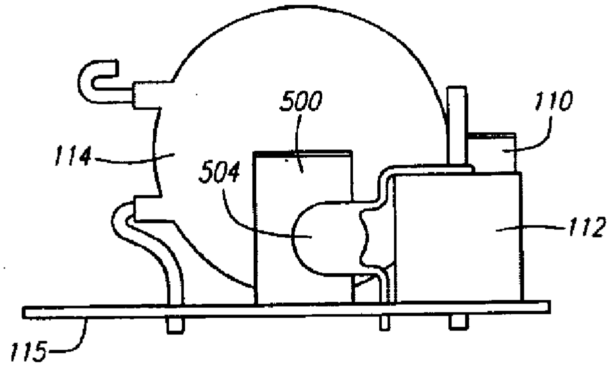
Figure 7A:
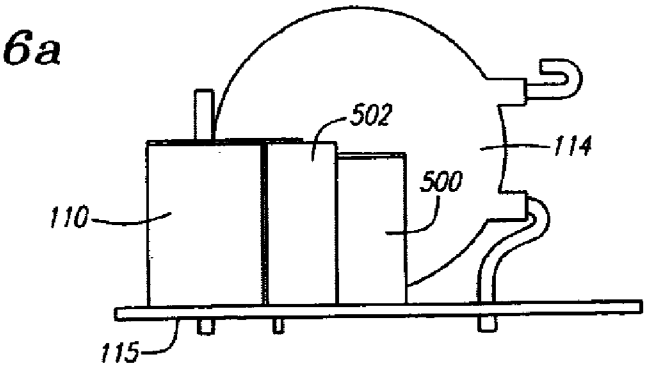
Figure 5B:
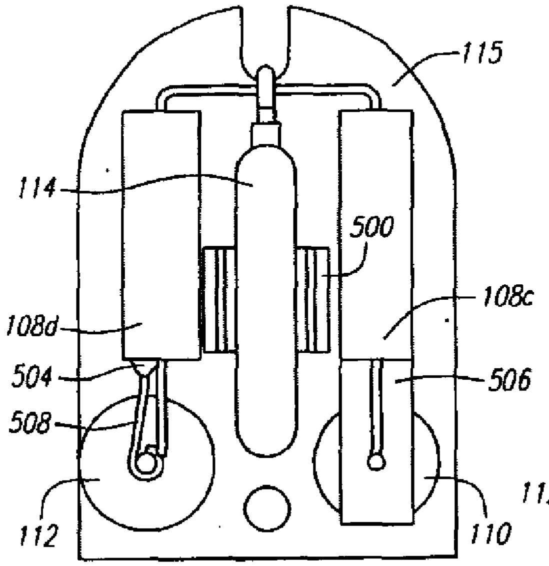
Figure 8B:
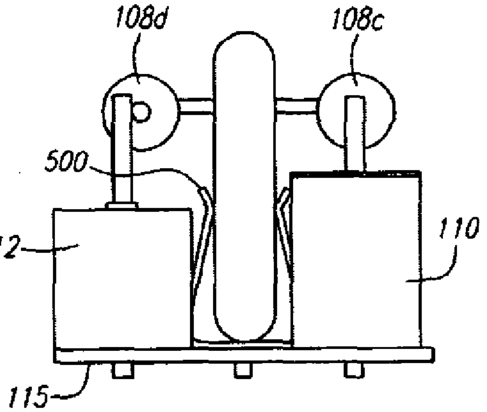
Figure 6B:
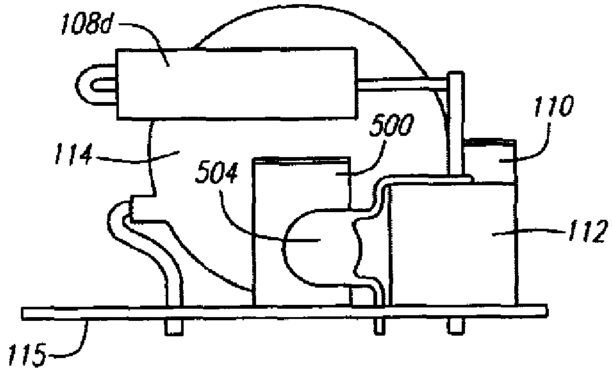
Figure 7B:
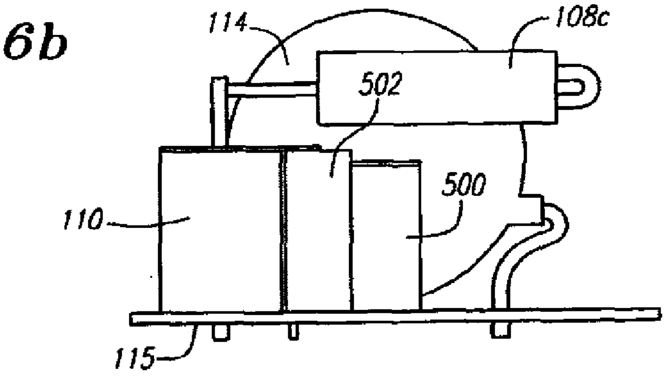
Figure 9:
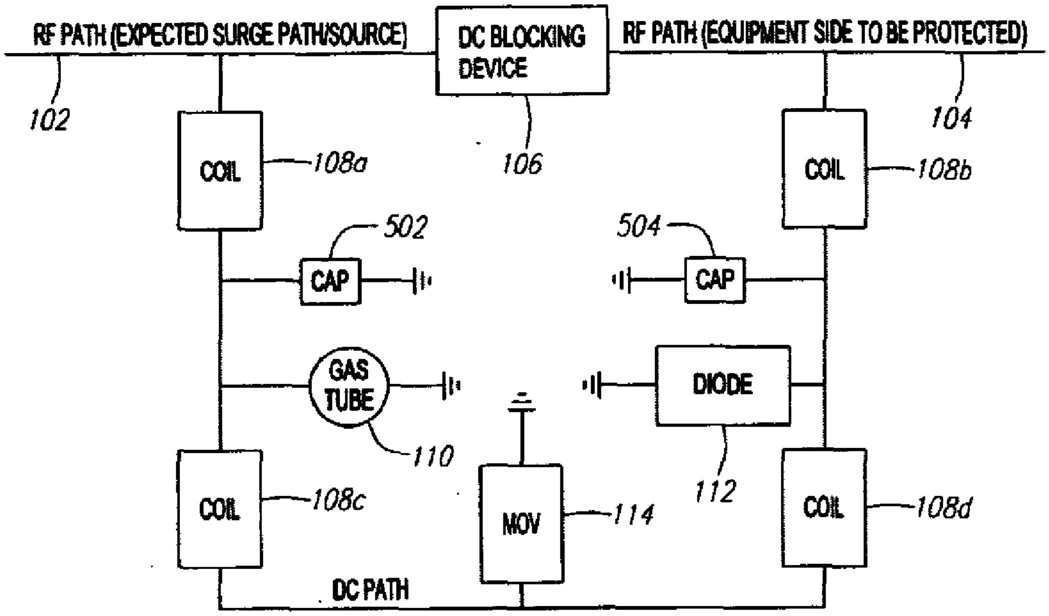
Figure 10:
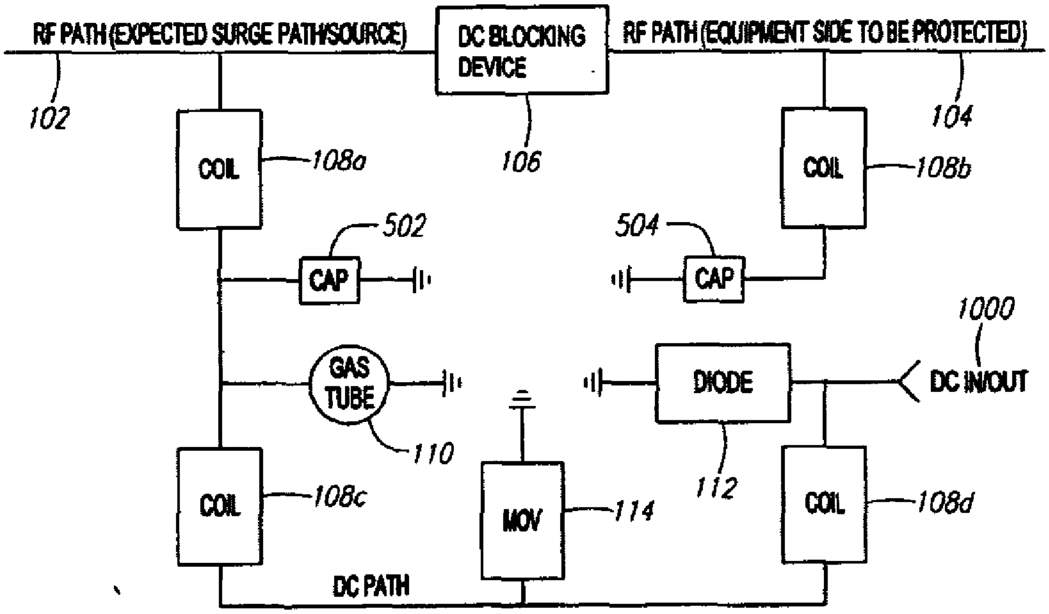

FIG. 10 is a schematic diagram that is a variation of the schematic diagram of FIG. 9. As shown in FIG. 10, the inductor 108*b* is not electrically coupled to inductor 108*d*. Therefore, rather than the dc power traveling across the inductor 108*b*, the dc power is removed from and injected into the circuit using a dc input/output terminal 1000. In a Bias-T configuration, the dc injection/pick-off is generally located at the dc input/output terminal 1000 as a feed-thru or connector through the housing wall 116 and internally connected to the dc path. Hence, the electronic equipment receives dc power from the dc input/output terminal 1000. The advantage of this type of configuration is to minimize the surge throughput energy to the equipment connected at the port 104. In addition, another advantage of this type of configuration is that it integrates the functionality for applying the dc power level to the coaxial system and allows the strength of the rf signal to be monitored. The dc input/output terminal 1000 can also be moved to other portions of the circuit. For example, the dc input/output terminal 1000 can be located between inductors 108*c*, 108*d*.

Although an exemplary embodiment of the invention has been shown and described, many other changes, combinations, omissions, modifications and substitutions, in addition to those set forth in the above paragraphs, may be made by one having ordinary skill in the art without necessarily departing from the spirit and scope of this invention. Accordingly, the present invention is not intended to be limited by the preferred embodiments, but is to be defined by reference to the appended claims.

What is claimed is:

1. A surge protection device comprising:

an input path for receiving an rf signal, dc power, and a surge;

an output path for propagating the rf signal and the dc power;

a dc blocking device coupled in series between the input path and the output path;

a first inductor coupled to the input path for isolating the rf signal and providing a path for the dc power and the surge;

a gas tube coupled to the first inductor for routing a portion of the surge to a ground plane;

a second inductor coupled to the first inductor for providing a path for the dc power;

a metal oxide varistor coupled to the second inductor for routing a portion of the surge to the ground plane;

a third inductor coupled to the second inductor for providing a path for the dc power;

a diode coupled to the third inductor for routing a portion of the surge to the ground plane; and a fourth inductor coupled to the third inductor for providing a path for the dc power to the output path.

2. The surge protection device of claim 1, further comprising a housing having a cavity for housing the dc blocking device, the first, second, third, and fourth inductors, the gas tube, the metal oxide varistor, and the diode.

3. The surge protection device of claim 2, wherein the cavity has a shape that is selected from a group consisting of a laterally stretched cylinder, an ellipse, an oval, and an ovoid.

4. The surge protection device of claim 3, wherein the shape of the cavity improves the impedance matching of the rf signal path and the bandwidth of the rf signal.

5. The surge protection device of claim 2, wherein the cavity is defined by two substantially parallel side walls and two substantially non-parallel end walls connecting the two substantially parallel side walls.

6. The surge protection device of claim 5, wherein at least one of the two substantially non-parallel end walls has a curved shape with a center point.

7. The surge protection device of claim 6, wherein the dc blocking device is positioned at the center point to improve the rf signal path and the bandwidth of the rf signal.

8. An apparatus for isolating dc power and a surge from an rf path to improve the bandwidth of an rf signal that travels along the rf path, the apparatus comprising:

a conductive plate;

an inductor positioned adjacent to the conductive plate for routing the dc power and the surge away from the rf path;

means, coupled to the inductor, for diverting the surge to the conductive plate; and a dc path coupled to the inductor for routing the dc power to the rf path.

9. The apparatus of claim 8, further comprising a housing having a cavity for holding the conductive plate.

10. The apparatus of claim 9, wherein the inductor, the means for diverting, and the dc path are positioned within the cavity.

11. The apparatus of claim 9, wherein the cavity is defined by two substantially parallel side walls and a curved end wall joining the two substantially parallel side walls.

12. The apparatus of claim 9, wherein the cavity has a shape selected from a group consisting of a laterally stretched cylinder, ellipse, oval, and ovoid.

13. The apparatus of claim 8, wherein the means for diverting is a gas tube.

14. The apparatus of claim 8, wherein the means for diverting is a metal oxide varistor.

15. The apparatus of claim 8, wherein the means for diverting is a diode.

16. The apparatus of claim 8, wherein the dc path includes a conductor.

17. The apparatus of claim 8, wherein the dc path includes a plurality of inductors.

18. An apparatus for reducing parasitic matched impedance of an rf path and isolating dc power and surge energy from the rf path to improve the bandwidth of an rf signal that travels along the rf path, the apparatus comprising:

a housing having a cavity;

a conductive plate positioned in the cavity;

a gas tube mounted on the conductive plate for diverting a portion of the surge energy to the conductive plate;

an inductor positioned proximate to the conductive plate and coupled to the gas tube for isolating the rf signal and passing the surge energy to the gas tube; and a dc path coupled to the inductor for routing the dc power to the rf path.

19. The apparatus of claim 18, further comprising a dc blocking device positioned along the rf path and coupled to the inductor.

20. The apparatus of claim 18, further comprising a metal oxide varistor coupled to the dc path for diverting a portion of the surge energy to the conductive plate.

21. The apparatus of claim 20, further comprising a mounting clip mounted on the conductive plate for coupling the metal oxide varistor to the conductive plate.

22. The apparatus of claim 20, wherein the metal oxide varistor is left-right centered on the conductive plate.

23. The apparatus of claim 18, further comprising a diode coupled to the dc path for diverting a portion of the surge energy to the conductive plate.

24. The apparatus of claim 23, wherein the diode is mounted on a left side of the conductive plate.

25. The apparatus of claim 24, further comprising a second capacitor mounted on the left side of the conductive plate and coupled to the diode.

26. The apparatus of claim 25, wherein the dc path includes a third inductor that is positioned above the second capacitor.

27. The apparatus of claim 18, wherein the gas tube is mounted on a right side of the conductive plate.

28. The apparatus of claim 27, further comprising a first capacitor mounted on the right side of the conductive plate and coupled to the gas tube.

29. The apparatus of claim 28, wherein the dc path includes a second inductor that is coupled to the inductor and positioned above the first capacitor.

30. The apparatus of claim 18, wherein the dc path includes a conductor and a plurality of inductors positioned above the conductive plate.

31. The apparatus of claim 18, wherein the cavity is defined by two substantially parallel side walls and a curved end wall joining the two substantially parallel side walls.

32. The apparatus of claim 31, further comprising a dc blocking device positioned along the rf path and proximate to the curved end wall.

33. A method for increasing the bandwidth of a surge protection device that is configured to receive an rf signal, dc power, and a surge, the surge protection device includes a dc blocking device, an inductor, and a gas tube, the method comprising:

providing a housing having substantially parallel side walls, a curved end wall, and a bottom surface that define a cavity, wherein the curved end wall has a center point;

positioning the dc blocking device within the cavity and above the bottom surface of the cavity for blocking the surge and passing the rf signal;

coupling the inductor to the dc blocking device for isolating the rf signal and providing a path for the dc power and the surge; and coupling the gas tube to the inductor and the bottom surface of the cavity for routing a portion of the surge to a ground.

34. The method of claim 33, further comprising coupling a second inductor to the inductor for providing a path for the dc power.

35. The method of claim 34, further comprising coupling a metal oxide varistor to the second inductor for routing a portion of the surge to the ground.

36. The method of claim 34, further comprising coupling a diode to the second inductor for routing a portion of the surge to the ground.

37. The method of claim 34, further comprising coupling a third inductor to the second inductor for providing a path for the dc power.

38. The method of claim 37, further comprising coupling a fourth inductor to the third inductor for providing a path for the dc power.

39. The method of claim 37, wherein the second and third inductors are positioned above the bottom surface of the housing.

40. The method of claim 33, wherein the curved end wall is eccentric in shape to enhance specific rf properties.

41. The method of claim 33, wherein positioning the dc blocking device within the cavity includes positioning the dc blocking device at the center point to enhance specific rf properties.

42. The method of claim 33, wherein positioning the dc blocking device within the cavity includes positioning the dc blocking device offset from the center point to enhance specific rf properties.

* * * * *

UNITED STATES PATENT AND TRADEMARK OFFICE

CERTIFICATE OF CORRECTION

PATENT NO. : 6,785,110 B2
DATED : August 31, 2004
INVENTOR(S) : Karl C. Bartel et al.

It is certified that error appears in the above-identified patent and that said Letters Patent is hereby corrected as shown below:

The title page consisting of the illustrated figure should be deleted to appear as per attached title page.

The sheets of drawings should be deleted to appear as per attached sheets.

Signed and Sealed this

Twenty-sixth Day of April, 2005

JON W. DUDAS
*Director of the United States Patent and Trademark Office*

(12) United States Patent
Bartel et al.

(10) Patent No.: US 6,785,110 B2
(45) Date of Patent: Aug. 31, 2004

(54) RF SURGE PROTECTION DEVICE

(75) Inventors: Karl C. Bartel, Carson City, NV (US); Arthur Peltier, Carson City, NV (US)

(73) Assignee: PolyPhaser Corporation, Minden, NV (US)

(*) Notice: Subject to any disclaimer, the term of this patent is extended or adjusted under 35 U.S.C. 154(b) by 106 days.

(21) Appl. No.: 10/267,213

(22) Filed: Oct. 9, 2002

(65) Prior Publication Data

US 2003/0072121 A1 Apr. 17, 2003

Related U.S. Application Data

(60) Provisional application No. 60/329,087, filed on Oct. 12, 2001.

(51) Int. Cl.[7] .......... H02H 1/00

(52) U.S. Cl. .......... 361/119; 361/111

(58) Field of Search .......... 361/107, 110–113, 361/117–120, 126, 127, 129, 130; 333/12, 32, 33, 125, 127, 129, 202, 242, 250, 251

(56) References Cited

U.S. PATENT DOCUMENTS 3,750,053 A * 7/1973 LeDonne .......... 333/105
3,831,110 A * 8/1974 Eastman .......... 331/107 G
3,845,358 A * 10/1974 Anderson et al. .......... 361/126
4,047,120 A * 9/1977 Lord et al. .......... 330/207
4,262,317 A * 4/1981 Baumbach .......... 361/124
4,359,764 A * 11/1982 Block .......... 361/119
4,384,331 A * 5/1983 Fukuhara et al. .......... 701/115
4,409,637 A * 10/1983 Block .......... 361/119
4,554,608 A * 11/1985 Block .......... 361/119
4,563,720 A * 1/1986 Clark .......... 361/111
4,689,713 A * 8/1987 Hourtane et al. .......... 361/118
4,698,721 A 10/1987 Warren .......... 361/110
4,727,350 A * 2/1988 Ohkubo .......... 338/21
4,984,146 A * 1/1991 Black et al. .......... 363/44
4,985,800 A 1/1991 Feldman et al. .......... 361/113
5,053,910 A * 10/1991 Goldstein .......... 361/111
5,057,964 A 10/1991 Bender et al. .......... 361/118
5,122,921 A 6/1992 Koss .......... 361/111
5,124,873 A 6/1992 Wheeler et al. .......... 361/58
5,321,573 A 6/1994 Person et al. .......... 361/111
5,537,044 A * 7/1996 Stahl .......... 324/511
5,617,284 A * 4/1997 Paradise .......... 361/111
5,625,521 A 4/1997 Luu .......... 361/111
5,667,298 A * 9/1997 Musil et al. .......... 366/18

(List continued on next page.)

FOREIGN PATENT DOCUMENTS

WO 9510116 4/1995 .......... H01C/7/10

OTHER PUBLICATIONS

Notification of Transmittal of the International Search Report, International Search Report, PCT/US03/17050, dated Mar. 10, 2004.

*Primary Examiner*—Ronald Leja
(74) *Attorney, Agent, or Firm*—Snell & Wilmer L.L.P.

(57) ABSTRACT

A surge protection device is disclosed that includes an input path for receiving an rf signal, dc power, and a surge, an output path for propagating the rf signal, and a dc blocking device coupled in series between the input path and the output path. The surge protection device also includes a first inductor coupled to the input path for isolating the rf signal and providing a path for the dc power, a gas tube coupled to the first inductor for routing a portion of the surge to a ground plane, a second inductor coupled to the first inductor for providing a path for the dc power, and a metal oxide varistor coupled to the second inductor for routing a portion of the surge to the ground plane. Furthermore, the surge protection device includes a third inductor coupled to the second inductor for providing a path for the dc power, a diode coupled to the third inductor for routing a portion of the surge to the ground plane, and a fourth inductor coupled to the third inductor for providing a path for the dc power to the output path.

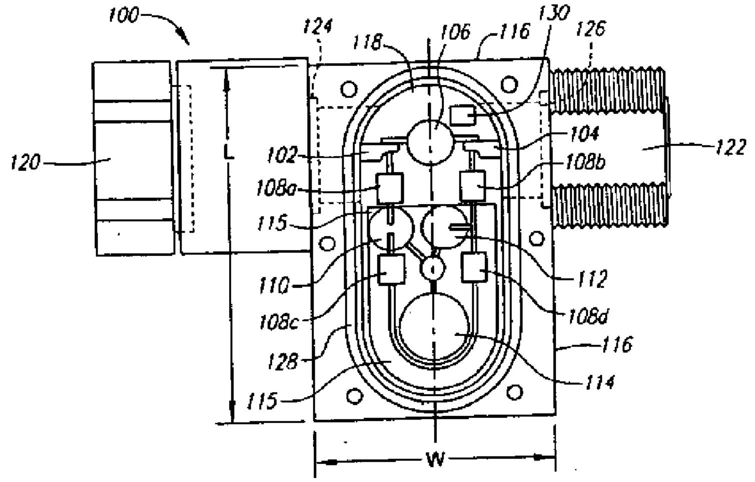

42 Claims, 9 Drawing Sheets